Dec. 23, 1924.                                   1,520,504
                    F. X. MUDD
          TRUCK FOR TRANSPORTING LIVE POULTRY
              Filed June 15, 1922        5 Sheets-Sheet 1
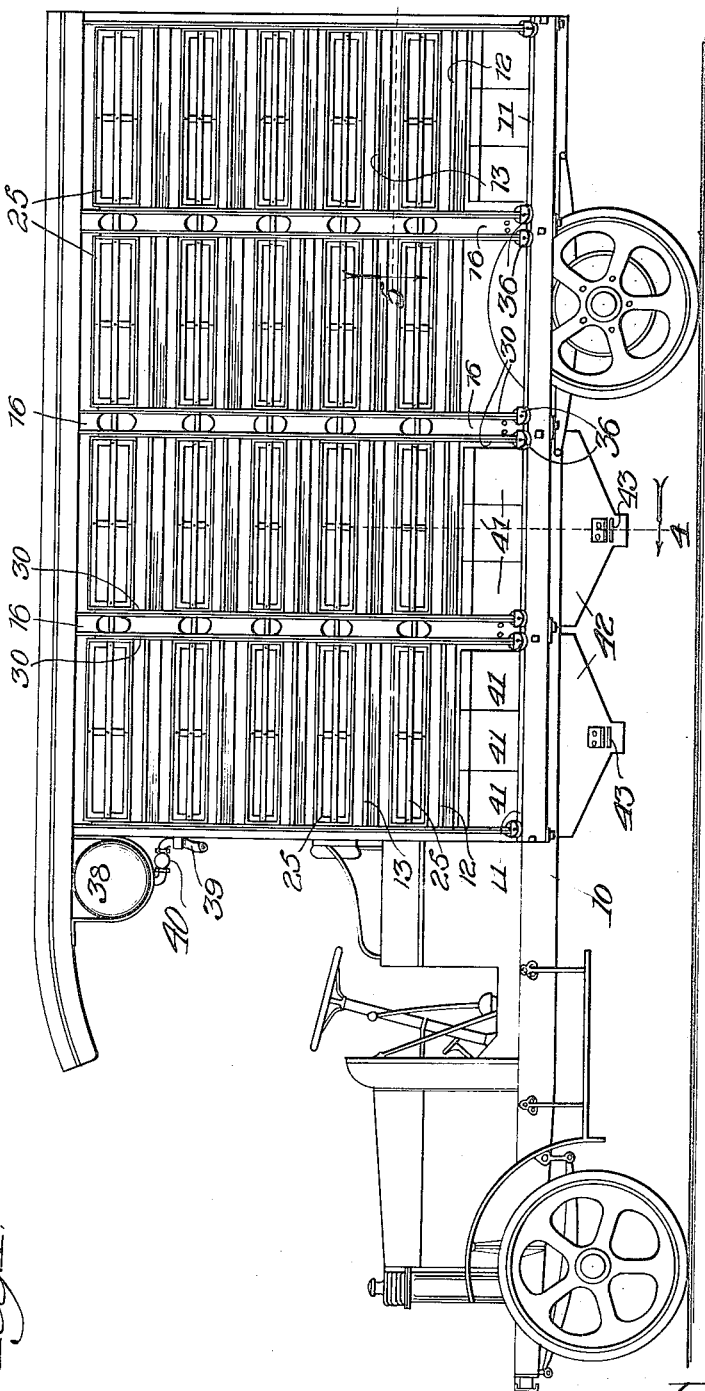

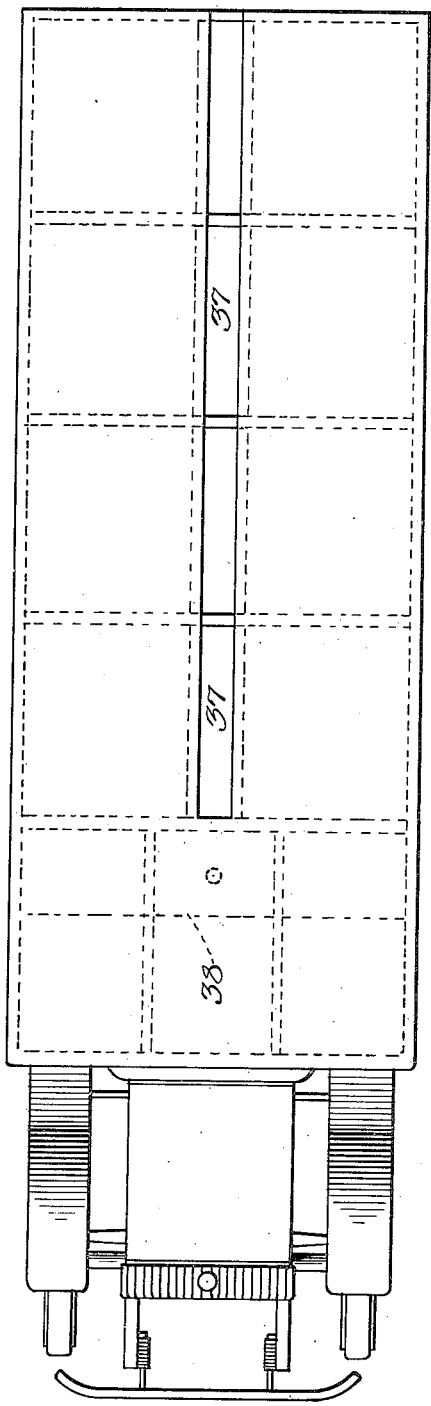

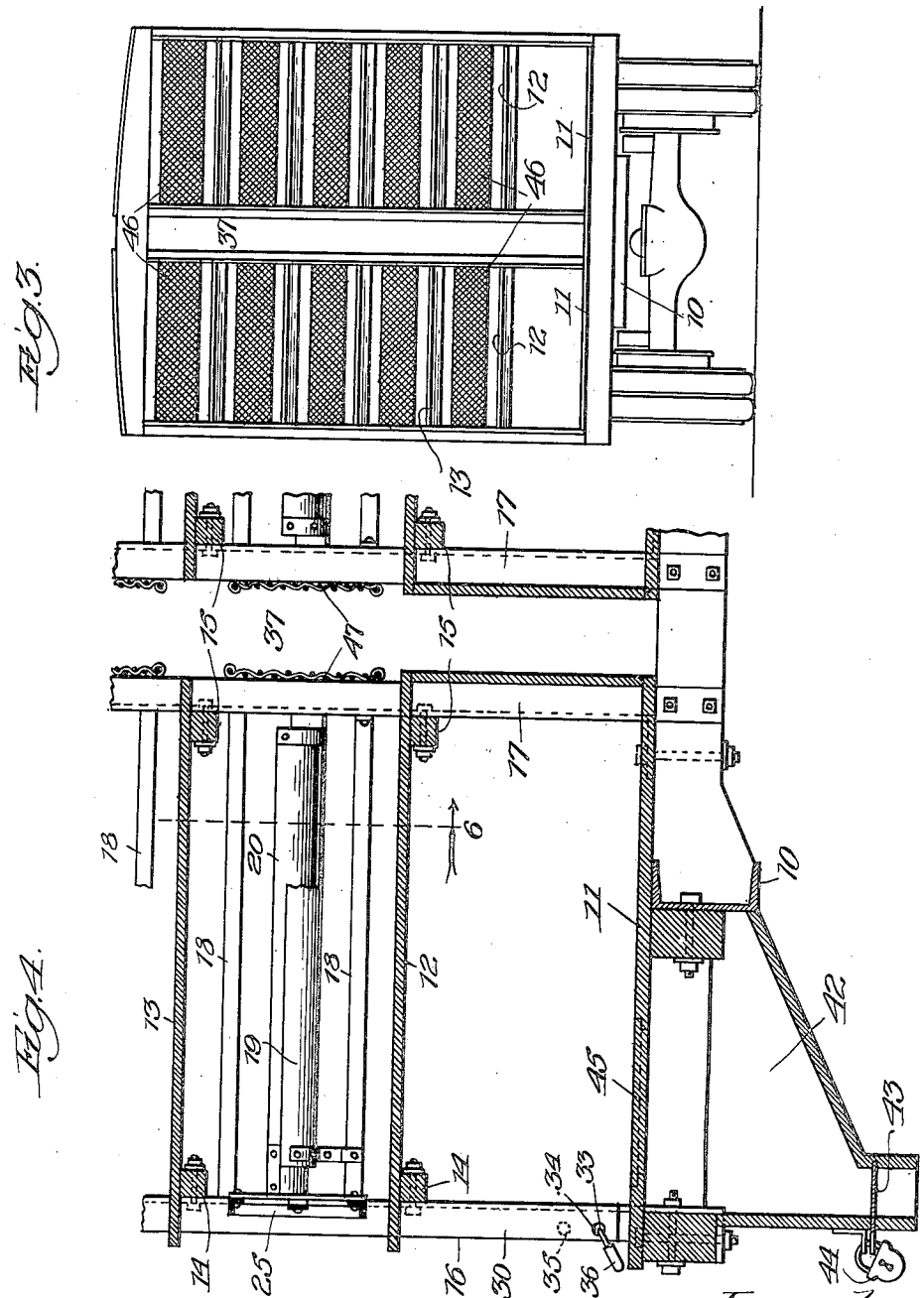

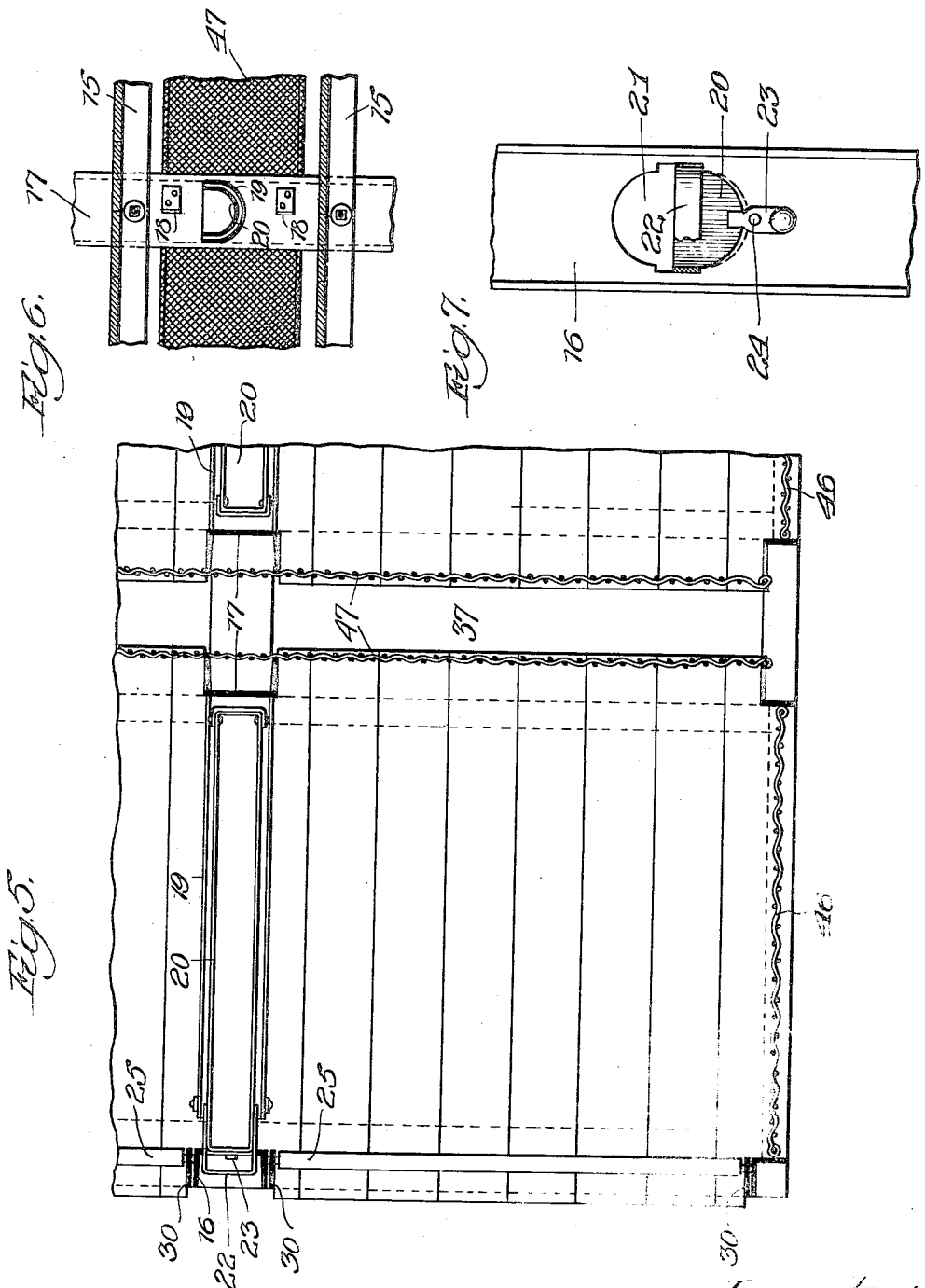

Dec. 23, 1924.
F. X. MUDD
1,520,504
TRUCK FOR TRANSPORTING LIVE POULTRY
Filed June 15, 1922   5 Sheets-Sheet 5
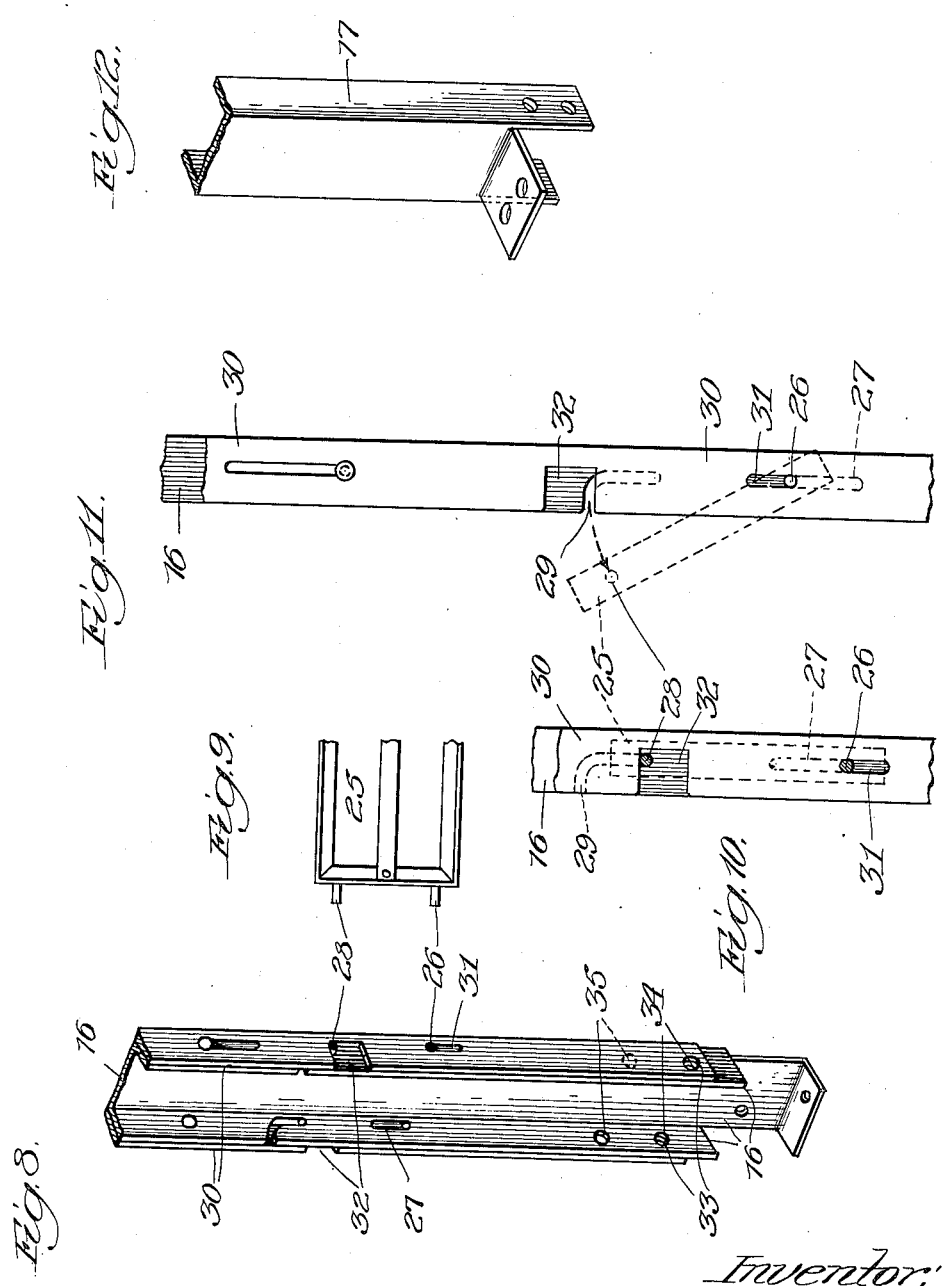
Inventor:
Frank X. Mudd,
By Dyrenforth, Lee, Chritton & Wiles
Att'ys Patented Dec. 23, 1924.

1,520,504

UNITED STATES PATENT OFFICE.

FRANK X. MUDD, OF CHICAGO, ILLINOIS, ASSIGNOR, BY MESNE ASSIGNMENTS, TO EQUIPMENT DEVICES COMPANY, A CORPORATION OF DELAWARE.

TRUCK FOR TRANSPORTING LIVE POULTRY.

Application filed June 15, 1922. Serial No. 568,510.

*To all whom it may concern:*

Be it known that I, FRANK X. MUDD, a citizen of the United States, residing at Chicago, in the county of Cook and State of Illinois, have invented a new and useful Improvement in Trucks for Transporting Live Poultry, of which the following is a specification.

This invention relates to trucks for transporting live poultry in bulk and is fully described in the following specification and shown in the accompanying drawings, in which:

Figure 1 is a side elevation of a motor truck embodying the invention;

Fig. 2 is a top plan view of the same;

Fig. 3 is a rear elevation of the truck;

Figs. 4 and 5 are enlarged partial sections on the lines 4 and 5 of Fig. 1;

Fig. 6 is a section on the line 6 of Fig. 4;

Fig. 7 is an enlarged partial side elevation of a side channel;

Fig. 8 is a partial perspective of the same showing the mechanism for locking the doors;

Fig. 9 is a partial front elevation of a door removed;

Figs. 10 and 11 are side elevations of the door locking mechanism in locked and unlocked positions, respectively; and Fig. 12 is a detail of an inner channel member.

In the embodiment shown a poultry transporting body is mounted upon a chassis frame 10 of any suitable type of motor truck. This body comprises a series of floors as 11, 12 and 13 which serve to separate vertical tiers of coops. These floors are carried upon longitudinal stringers 14 and 15 which are suitably secured to outer and inner vertical channels 16 and 17, respectively.

The floor of each tier on each side of the coop is provided with a series of compartments by means of transverse slats 18 which are secured to pairs of channels 16 and 17.

Adjacent coops on the same level are also separated by means of shells 19 in which are slidably mounted troughs 20 which are arranged to slide endwise through openings 21 in the side channel 16. These troughs are provided with handles 22 which assist in easy withdrawal of the trough from the side channels but are normally held locked by means of weighted fingers 23 which are hingedly mounted upon the side channels by means of pins 24.

The coops at each side of the body face outwardly and are closed by means of doors 25 which are hingedly mounted at the bottom on horizontal pins 26 which extend through vertically arranged slots 27 in the outer channel members 16. Locking pins 28 are provided at the upper edge of the doors which are arranged to swing into the curved slot 29 in the flanges of the side channel members, when the door is held in raised position as shown in Fig. 11.

This is accomplished by providing at the sides of the channel members 16 locking members 30 which have vertical slots 31 therein as shown in Figs. 10 and 11. This locking member also has an opening 32 which, in the raised position, registers with the opening 29 so as to permit the pin 28 to enter. This pin, as shown in Fig. 8, is long enough to pass through the flange of the channel 16 and engage the locking member 30.

In order to lock the doors of one of the vertical tiers the doors are swung into position when the parts are in the position shown in Fig. 11 when the locking member at each side of the tiers is lowered to the position shown in Figs. 8 and 10, thereby moving the pins 26 and 28 to the bottoms of the slots 27 and 29, respectively, thereby preventing the doors from being again opened until the locking members 30 are again raised to the position shown in Fig. 11.

An opening 33, in Fig. 8, is provided in the locking member 30 which is adapted to register with openings 34 and 35 at the locked and unlocked positions, respectively, of the member 30. Any suitable means, as padlocks 36 (Fig. 1), may be employed for holding these openings in registration, thereby holding the locking members in the locked or unlocked position as desired.

The coops at each side of the truck body are separated from those of the opposite side by a vertical light and air shaft 37 which extends entirely through the truck body from top to bottom as shown in Figs. 2, 4 and 5. This permits air to circulate freely through the center of the body between the coops on each side and permits dirt from the coops to fall out through the truck upon the roadway.

A water tank 38 is secured at the upper forward part of the truck body which is provided with a hose 39 which is controlled by a valve 40 and although shown broken off may be of sufficient length to reach to any of the troughs 20 throughout the truck body. If desired, a hose of this kind may be provided for each side of the truck.

A series of egg cases 41, or the like, may be provided on the bottom tier and these may be held in place in any desired manner as by means of doors similar to those employed upon the fronts of the coops.

Feed bins 42 are also provided at the sides of the trucks and have hopper bottoms which are normally closed by means of slides 43 and padlocks 44 as shown in Fig. 4. Doors 45 are provided in the floor 11 for filling these feed bins.

The rear of the coops are closed by means of screens 46 or the like and similar screens 47 are placed between the backs of the coops and the air shaft 37.

It will thus be seen that I have provided a motor truck for transporting live poultry in bulk which is so arranged as to provide all of the best facilities for loading, unloading, feeding and watering and otherwise taking care of the poultry in the truck for an indefinite period.

While I have shown and described certain embodiments of my invention, it is to be understood that it is capable of many modifications. Changes, therefore, in the construction and arrangement may be made without departing from the spirit and scope of the invention, as disclosed in the appended claims, in which it it my intention to claim all novelty inherent in my invention as broadly as possible in view of the prior art.

What I claim as new, and desire to secure by Letters Patent, is:

1. A truck for transporting live poultry comprising a light and air admitting and dirt discharging shaft extending vertically through the top and bottom of the truck, a plurality of compartments arranged on each side of said shaft and extending thereto at their rear, each of said compartments having an opening at one side of the truck, a door movable to close each of said openings, said compartments and doors being arranged in tiers, and means for simultaneously locking the doors in each tier in closed position.

2. A truck for transporting live poultry comprising a light and air admitting and dirt discharging shaft extending vertically through the top and bottom of the truck, a plurality of compartments arranged on each side of said shaft and extending thereto at their rear, each of said compartments having an opening at one side of the truck, a trough slidably mounted between each pair of horizontally adjacent compartments, a door movable to close each opening, said compartments and doors being arranged in tiers, and means for simultaneously locking the doors in each tier in closed position.

3. A truck for transporting live poultry comprising a light and air admitting and dirt discharging shaft extending vertically through the top and bottom of the truck, a plurality of compartments arranged on each side of said shaft and extending thereto at their rear, each of said compartments having an opening at one side of the truck, a trough slidably mounted between each pair of horizontally adjacent compartments, said trough being adapted to be completely withdrawn from its mounting, a door movable to close each opening, said compartments and doors being arranged in tiers, and means for simultaneously locking the doors in each tier in closed position.

4. A truck for transporting live poultry comprising a plurality of compartments each having an opening at one side of the truck, said compartments opening at opposite sides of the truck, an air shaft extending vertically through the top and bottom of said truck and separating the compartments on one side from the compartments on the other, a door movable to close each opening, said compartments and doors being arranged in tiers and means for simultaneously locking the doors in each tier in closed position.

5. A truck for transporting live poultry comprising a plurality of compartments each opening at one side of said truck, the compartments on one side being separated from those on the other side by a central longitudinal air shaft extending vertically through the top and bottom of the truck whereby light and air are provided for the back of each compartment and dirt is permitted to pass out of the truck through said air shaft.

FRANK X. MUDD.